United States Patent [19]

Bright

[11] 3,974,395
[45] Aug. 10, 1976

[54] POWER GENERATING APPARATUS

[76] Inventor: Clark Bright, 151 Makai Place, Kula Kai, Maui, Hawaii 96790

[22] Filed: June 2, 1975

[21] Appl. No.: 582,613

[52] U.S. Cl. .................................. 290/44; 290/55
[51] Int. Cl.² ................................................ H02P 9/04
[58] Field of Search ............................... 290/44, 55

[56] References Cited
UNITED STATES PATENTS

| | | | |
|---|---|---|---|
| 1,366,844 | 1/1921 | Snee | 290/44 |
| 2,118,124 | 5/1938 | Weeks | 290/49 |
| 2,148,804 | 2/1939 | Claytor | 290/44 |
| 2,152,576 | 4/1939 | Weeks | 290/44 |
| 2,178,679 | 11/1939 | Claytor | 290/44 |

*Primary Examiner*—Robert K. Schafer
*Assistant Examiner*—John W. Redman

[57] ABSTRACT

A control system for obtaining maximum power output from electrical generating water pumping, flywheel storage and like systems comprising a wind-driven prime mover coupled to an electrical generator over an extended range of wind velocities is described. The maximum electrical output power is obtained by synchronizing the speed of the generator, and hence the speed of the prime mover, with the maximum power output of the prime mover. Since the maximum output power of a wind-driven prime mover is proportional to the third power of the wind velocity, and is a function of an angular velocity-dependent power coefficient, means are provided for detecting the angular velocity of the prime mover and generating a signal proportional to the cube of said wind velocity. The singal thus generated is used for controlling the magnitude of the excitation field current in the electrical generating apparatus whereby the electrical output varies approximately as a cubic function of the wind velocity and, consequently, as a linear function of the output power of the prime mover. For this purpose the control-signal generating means employs a solid state device or the like which is biased to operate along the third power portion of its characteristic operating curve.

15 Claims, 5 Drawing Figures

$A = V^3$
$B = e^{1.04E}$
$C = e^{1.04E} - 1$

POWER GENERATING APPARATUS

BACKGROUND OF THE INVENTION

The present invention relates to the generation of power in general and, more particularly, to a novel control system for obtaining maximum power output from an electrical generating fluid-driven prime mover having a velocity-dependent power output for driving a generator, alternator or the like. An example of a prime mover of the type described is a windmill. Another example is a water wheel.

A theoretical and empirical analysis of windmills, a similar analysis being applicable to water wheels and other fluid-driven prime movers, reveals that the power output, P, of a windmill is directly proportional to the radius, R, of the blades, the velocity, V, of the wind, the mass density, $\rho$, of the air in the wind, and a power coefficient, $P_c$, according to the relationship $$P \propto P_c \rho R^2 V^3 \qquad (1)$$

The power coefficient, $P_c$, is also a function of wind velocity. More particularly, it is a function of the geometrical arrangement of the windmill, and of the tip speed ratio $2\pi nR/V$ where $n$ is the angular velocity of the blades, and R and V are as previously defined. The power coefficient, $P_c$, has been determined in wind-tunnel tests for various blade arrangements. From the foregoing analysis and the tests referred to, it is found that for a given windmill there is an optimum angular velocity of the blades at which maximum power is obtained. For maximum efficiency of the system, and hence the generation of maximum electrical power over a useful range of wind velocities, it follows therefrom that the angular velocity of a windmill should be maintained at that velocity for which maximum power is obtained, regardless of any change in wind velocity.

Heretofore, a number of schemes have been proposed and employed for controlling the angular velocity of a windmill for most efficient power production. In electrical generating systems, for example, it has been the practice to vary either the load on the generator or to vary the field current or both as a function of the wind velocity for the purpose of loading the driving windmill.

For example, in a typical system employing load control, a wind switch comprising a spring-biased wind vane or wind-driven fan or the like has been employed for selectively varying a load, such as a plurality of batteries, coupled to the generator.

The switch, in response to predetermined wind velocities opens and closes electrical circuits for removing and adding electrical loads from and to the generator. In use for charging batteries, for example, the switch at low wind velocities couples a first predetermined number of batteries to the generator and at higher wind velocities couples an additional number of batteries to the generator. For all practical purposes, it has not been possible to obtain any reasonably close correspondence between the electrical power generated and the output power of a windmill over any reasonably wide range of wind velocities using such methods.

More practical than load control in most electrical applications is generator control. Generator control typically employs a means for controlling the excitation field current, and hence the electrical power output.

In such a system, the resistance of the field circuit is controlled to vary the current in the field circuit. In a number of these sytems, for example, a variable resistance, such as a carbon pile resistor is employed. A mechanical linkage, belts, pulleys and the like are used for detecting changes in the velocity of the windmill and a mechanism in response to such changes controls the pressure on the resistor and thereby its resistance.

In another such system, a wind switch, like that described above which has been used in load control systems, is employed for controlling the placement of a number of discrete resistors in the field circuit. With changes in wind velocity, a corresponding change is made in the number and arrangement of the resistors.

Even with field control, however, prior known wind-driven electrical generating systems are still quite inefficient over a wide range of wind velocities because of the difficulty in building a control system with a third power dependence on wind velocity.

Theoretically, at least, it would appear to be possible to come somewhat closer to the power output curve than has been possible in the prior known wind-driven electrical generating systems by expanding the techniques employed in those systems, but the number of resistors, switches and relays that would be required would be costly and wasteful of energy.

A further characteristic of winds which is of interest is the distribution of wind velocities over a period of time.

Winds are ordinarily classified in two groups: prevalent winds and energy winds. In wind studies it is found that prevalent winds blow about 75 percent of the time and energy winds blow about 25 percent of the time. Energy winds, however, have average velocities about 2.3 times those of prevalent winds and, therefore, contain about 75 percent of the total energy generated by winds.

Since, theoretically, a maximum of only 59.2 percent of the power in the wind is obtainable by a windmill to do work, and that in practice only 30 to 40 percent is actually obtained using the most efficient windmills presently known, it is extremely desirable to not only have a more efficient system but one which is efficient over a wide range of wind velocities. Yet, it is known that conventional windmills employed in the generation of electrical energy, typically operate only at relatively low wind velocities and, therefore, do not take advantage of the energy available at higher wind velocities.

SUMMARY OF THE INVENTION

In view of the foregoing, a principal object of the present invention is a means for generating power including a control system for obtaining maximum power output over a wide range of operating speeds.

Another object of this invention is a means for controlling the power derived from a fluid-driven prime mover over a wide range of fluid velocities with near maximum efficiency.

Still another object of the invention is an apparatus comprising a fluid-driven prime mover coupled to an electrical generator for obtaining maximum power over a wide range of fluid velocities, particularly wherein the fluid is air and the prime mover is a windmill.

Still another object of the invention is a control system for operating a windmill most efficiently for providing maximum output power over a wide range of wind velocities.

Still another object of the invention is a control system which approximates, with an exponential function, a function to a power.

Still another object of the invention is a control system which employs an amplifying means for providing an output signal which is an exponential function of a signal applied to its input wherein the exponential function is readily adjustable for closely approximating a third order dependence.

In accordance with the above objects, there is provided in a preferred embodiment of the present invention, a means, such as a tachometer-type device coupled to a windmill, for generating an output signal having an amplitude which varies as a linear function of the wind velocity. The output signal is applied to the input of a first amplifier comprising an emitter follower. The magnitude of the output of the emitter follower is adjustable and is applied to the input of a second amplifier. The output of the second amplifier drives an output stage having in its output circuit the field circuit of an electrical generating means or the like. A zener diode or the like is provided at the input of the second amplifier for overload protection.

By an appropriate adjustment of circuit impedances associated with the amplifying circuit, the current in the field circuit of the electrical generating means varies approximately as a cubic function of the velocity of the wind, and hence as a linear function of the output power of the windmill.

DESCRIPTION OF THE DRAWING

The above and other objects of the present invention will become apparent in the following detailed description of the accompanying drawing in which.

DETAILED DESCRIPTION

Figure 1:
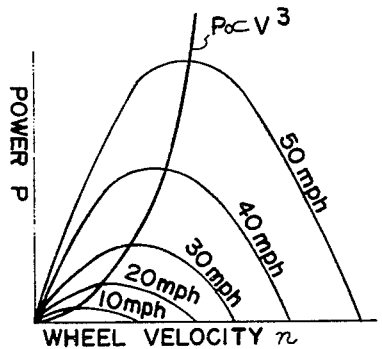
FIG. 1 is a diagram of power output of a windmill versus wheel velocity for a plurality of wind speeds.

Referring to FIG. 1, there is provided a plurality of curves representing the power output, P, of a windmill versus wheel velocity, $n$, for a plurality of wind speeds: 10, 20, 30, 40 and 50 miles per hour. The diagram of FIG. 1 shows that, for any given wind speed, the power output, P, of a windmill rises to a maximum and then decreases with increasing wheel velocity. The diagram also shows that the maximum power output occurs at a higher wheel velocity with increasing wind velocities and that the power output is a cubic function of the wind velocity such that $P \propto V^3$.

More specifically, a theoretical and empirical analysis of windmills reveals that the power output varies, in the manner shown in FIG. 1, as a function of the radius, R, of the blades, the velocity, V, of the wind, the mass density, $\rho$, of the air in the wind, and a power coefficient, $P_c$, according to the relationship $$P \propto P_c \rho R^2 V^3 \qquad (1)$$

Figure 2:
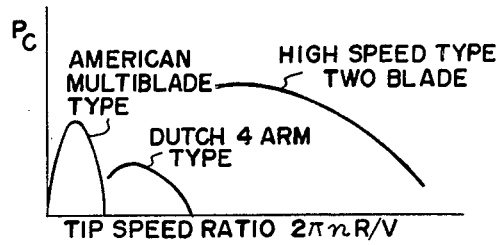
FIG. 2 is a diagram of power coefficient versus tip speed ratio for a plurality of types of windmills.

In FIG. 2, there is shown a plurality of curves representing the power coefficient, $P_c$, versus tip speed ratio, $2\pi n R/V$, where $n$ is the angular velocity of windmill blades for three types of windmills, an American multiblade type, a Dutch four-arm type and a high-speed two-blade type. The curves of FIG. 2, are based on empirical results obtained in wind-tunnel tests, and show the non-linear dependence of the power coefficient on angular velocity of a windmill and wind velocity. It is clear, from FIG. 2, that the power coefficient, $P_c$, for each type of windmill tested increases to a maximum and thereafter decreases with increasing tip speed ratio. It follows therefrom that the velocity dependency of the power coefficient as shown in FIG. 2 accounts for the non-linear increase in output power of a windmill as a function of wind velocity as shown in FIG. 1 and, indeed, points up the importance of operating a windmill of a particular design at a particular tip speed ratio for maximum efficiency.

Because the power available from the wind varies as the third power of the wind velocity, an ideal control system would allow extracting power with the same functional relationship. Unfortunately, it is difficult to build a control system with this third power dependence. It is, however, not nearly as difficult to design a control system with an exponential functional dependence. This is because all semiconductor rectifying devices exhibit this type of behavior: i.e., the current, I, is proportional to the natural logarithm base, $e$, raised to a power dependent on the voltage, E: i.e., I $\propto$ $e^{CE}$ where "C" is an arbitrary "constant." In general, I $\propto$ $e^{CE}$ is the relationship used for a semiconductor rectifying junction. However, for low values of "E" (typically less than 0.1 volts) I $\propto$ ($e^{CE}-1$) is more correct. It follows from the foregoing that, if one chooses a value of E, C being an arbitrary constant, such that the resulting value of "I" is approximately equal to that obtained from a third power dependence (I $\propto$ $E^3$) for an adequate range in values of E, a very simple and efficient wind power control system is possible.

Thus, recognizing that the wind power available, $P_{in} \propto V^3$ where "V" is wind velocity, an electrical signal, E, may be generated which is proportional to V: i.e., E $\propto$ V. This signal E may then be used to generate a current I $\propto$ $e^{CE}$. The value of E, and, hence "CE", is chosen so that for a desired range of V and, thus, E, the resultant current is approximately equal to the third power of E: i.e., I $\propto$ $e^{CE} \simeq E^3 \propto V^3$. This current may then be used to control the power extracted from the wind, $P_{out} \propto$ I.

In the following table, there is provided various choices of E and hence, CE, representing a specific wind velocity. In columns 3 and 4, CE is chosen to be 1. CE is replaced by another letter in columns 5–10 to denote each different choice. In columns 5 and 6, X is chosen to be 1.1. In columns 7 and 8, Z is chosen to be 1.04. In columns 9 and 10, C is chosen to be 0.97. The result of each specific choice is evaluated over a range of wind velocities, V. Thus, by choosing a value of E — i.e., CE — for a specific value of velocity, V, one may make a comparative determination of how well the exponential control matches the desired third power dependence.

TABLE OF TRIAL DESIGNS

| 1 P | 2 V/Vo | 3 $e^{CE}$ | 4 $e^{CE}-1$ | 5 $e^X$ | 6 $e^X-1$ | 7 $e^Z$ | 8 $e^Z-1$ | 9 $e^r$ | 10 $e^r-1$ |
|---|---|---|---|---|---|---|---|---|---|
| 1 | 1 | 2.72 | 1.72 | 3.0 | 2.0 | 2.83 | 1.83 | 2.63 | 1.63 |
| 8 | 2 | 7.39 | 6.39 | 9.0 | 8.0 | 8.00 | 7.00 | 6.90 | 5.90 |
| 27 | 3 | 20.1 | 19.1 | 27.0 | 26.0 | 22.63 | 21.63 | 18.12 | 17.12 |
| 64 | 4 | 54.6 | 53.6 | 81.0 | 80.0 | 64.00 | 63.00 | 47.59 | 46.59 |
| 125 | 5 | 148.4 | 147.4 | 243.0 | 242.0 | 181.27 | 180.02 | 125.00 | 124.00 |

Referring to the above table, one may consider the following example in which normalized values are used for easy comparison. Assume that for a given windmill at some wind velocity "Vo", the power available, P, is arbitrarily equal to one unit. Doubling the wind velocity, V, will yield a value of 8 for "P" ($P \propto V^3 = 2^3 = 8$) as shown in the first and second columns of the table. A wind velocity, V, of three times the initial velocity, Vo, will produce $P = 3^3$ or 27 times the initial power. The ratio of the wind velocity being considered (V) to the initial wind velocity (Vo) is listed in column 2 of the table.

The values for $I \propto e^{CE}$ are listed in the remaining columns for the various normalized wind velocities. For the design example of column 3, the value of CE was arbitrarily chosen to equal one at a wind velocity, V, equal to Vo. Other choices for E and, thus, for the product CE can, of course, be made and examples are listed in the columns, 4–10 (where CE has been replaced by another letter to denote each different choice).

Ideally, the values of I under one or another of the columns 3–10 should correspond to the associated value for P in column 1 and to a greater extent than heretofore obtained, such correspondence is achieved over a relatively wide range of wind velocities. For example, for $X = 1.1$, I in columns 5 and 6 for a velocity ratio of 2 and 3, there is essentially a one-to-one relationship between I and P. Under columns 7 and 8, for $Z = 1.04$, the correspondence between I and P extends over a range of velocity ratios of 2, 3 and 4. Thus, based on a value of $CE = 1.04$ and an initial wind velocity of 10 mph, one may reasonably expect efficient power generation over a range of wind velocities of 10 to 40 mph and beyond.

Figure 5:
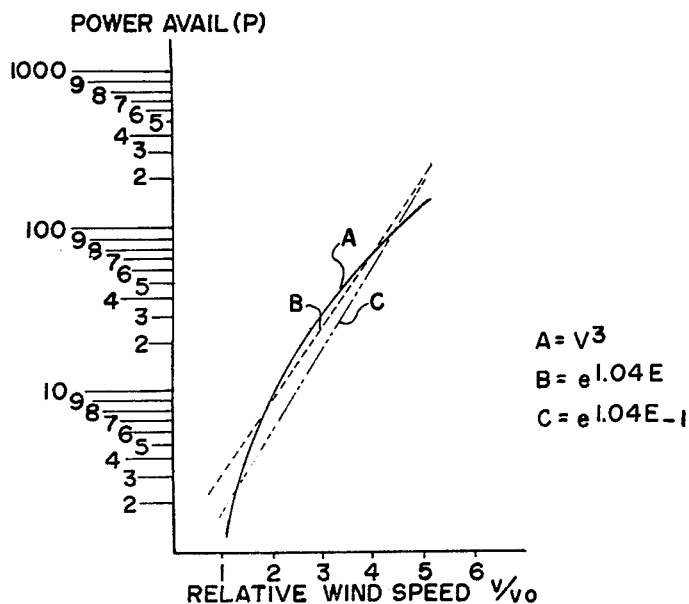
FIG. 5 is a plot of a design trail of ideal power versus relative wind speed according to the present invention.

Referring to FIG. 5, there is shown a semi-log plot of the design trial listed in columns 7 and 8 of the table as well as the ideal power listed in column 1 versus relative wind speed (column 2) for Z equal to 1.04. The plot shows, possibly more clearly than the table, how closely the control system of the invention approximates the ideal conditions.

The "best" design depends on the range of velocities and the specific velocities at which control accuracy is most important. Note that a range of 5 in velocity is very large. For example, if the initial V = Vo represented, in fact, a 10 mph wind, 5Vo = 50 mph. Some inaccuracy and, hence, inefficiency in control at 5Vo would not be important, and any over "current control" — e.g., 180 (column 8) versus 125 (column 1) would typically be reduced by generator saturation losses. Alternatively, at low wind velocities "overloading" the propeller — i.e., trying to extract too much power from the wind — can be tolerated with less loss in efficiency than at high wind velocities because of the broad maximum in the power curve (see FIG. 1). Thus, the best design is determined by evaluating the specific conditions of a given application.

Referring to FIG. 2, there is provided in accordance with the above design considerations a windmill 1 having an output shaft 2 coupled to a generator 3 for generating electrical power on a pair of output lines A and B. Coupled to the shaft 2 is a tachometer 4 for generating an output signal E as a function of wind velocity, V. The output of tachometer 4 is coupled to the input of a field control circuit 5 for controlling the field current, I, in the field circuit of the generator 3.

Figure 3:
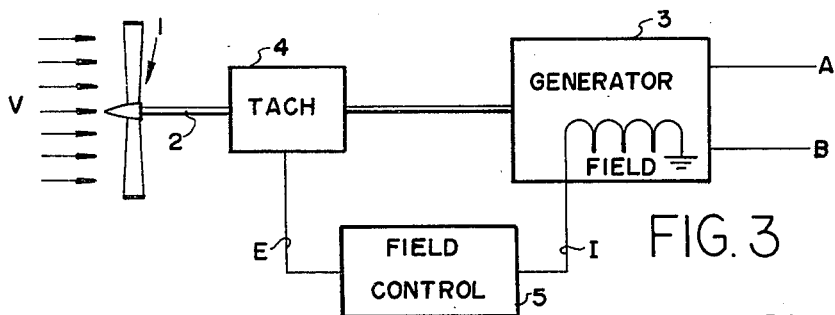
FIG. 3 is a block diagram of an electrical generating system according to the present invention.
Figure 4:
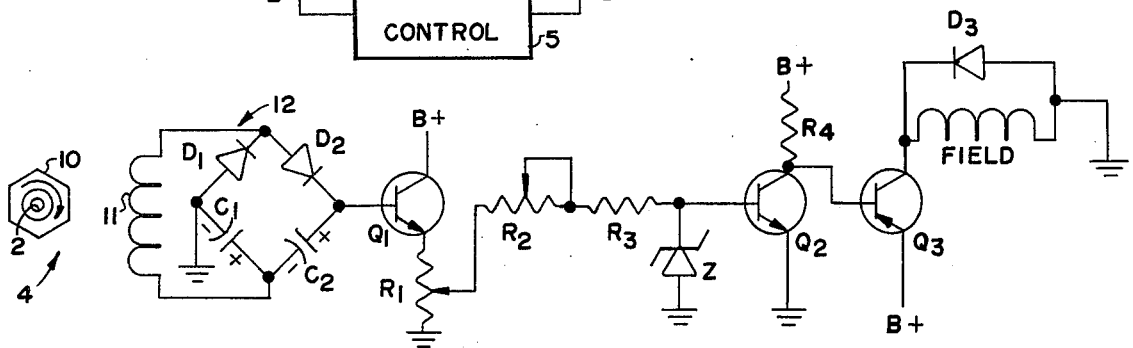
FIG. 4 is a schematic diagram of the system of FIG. 3.

Referring to FIG. 4, there is shown a specific embodiment of the system of FIG. 3. The tachometer 4, which may take the form of a conventional magneto, comprises a multi-sided magnetic member 10 and an output winding 11. Member 10 is coupled to shaft 2 and rotates at a speed corresponding to the speed of rotation of the shaft. As the member 10 rotates in synchronism with the shaft 2, a signal is generated having an amplitude and frequency corresponding to the speed of rotation. The member 10 may be coupled directly to the shaft 2, as shown, or it may be coupled thereto as by gears (not shown).

The winding 11 is coupled to a voltage doubler 12. Doubler 12 comprises a pair of diodes $D_1$ and $D_2$ and a pair of capacitors $C_1$ and $C_2$ arranged in a conventional bridge circuit. Coupled to the doubler 12 is a first transistor amplifier $Q_1$. Transistor amplifier $Q_1$ is arranged as an emitter follower with a potentiometer $R_1$ provided in its emitter circuit. Potentiometer $R_1$ is adjusted according to the starting torque of a particular windmill as described below. The wiper of potentiometer $R_1$, designated by an arrowhead in the conventional manner, is coupled in series by means of a reostat $R_2$ and a fixed resistor $R_3$ to the base of a second transistor amplifier $Q_2$ arranged as a grounded emitter amplifier. $Q_2$ has in its collector circuit a collector resistor $R_4$. The particular values of $R_2$, $R_3$ and $R_4$ are chosen for obtaining from $Q_2$ an output as a function of its input for the range of wind velocities and the specific velocities at which control accuracy is most important according to the above design considerations. Also coupled between the base of $Q_2$ and ground is a zener diode Z. Diode Z is provided to prevent overdriving $Q_2$. The collector of $Q_2$ is coupled to the base of a third transistor amplifier $Q_3$. $Q_3$ is arranged as a grounded collector transistor amplifier and has in its collector circuit, coupled in parallel, a diode $D_3$ and the field winding, Field, of generator 3.

For a generator 3 having a field winding of 4 ohms and having a rating of 60 amperes at 12-13 volts, the following values of circuit parameters and the types of circuit devices employed are typical:

| | |
|---|---|
| $D_1$ and $D_2$ | 1N192 |
| $C_1$ and $C_2$ | 10μfd |
| $Q_1$ | 2N1507 |
| $R_1$ | 10KΩ |
| $R_2$ | 10KΩ |
| $R_3$ | 4.7KΩ |
| Z | 1N4736A |
| $Q_2$ | 2N1507 |

-continued

| | |
|---|---|
| $R_1$ | 47Ω |
| $Q_3$ | 2N174 |
| $D_3$ | 1N4004 |
| B+ | 12 volts |

Windmills in general, and high efficiency windmills in particular, as shown in FIG. 2, exhibit low starting torque. It is important, therefore, to allow the windmill to reach its most efficient tip speed before coupling a load to the windmill. In practice, this is accomplished by adjusting the potentiometer $R_1$ in the output of $Q_1$ for providing an output when the output of the voltage doubler 12 has reached a predetermined amplitude. This may be referred to as the reference amplitude and is determined for a given windmill at a particular wind velocity at which the windmill is generating maximum output power.

For example, assuming a particular wind speed, $R_1$ is adjusted such that the power generated by generator 3, including losses, equals the maximum power output of the windmill 1 at that particular wind speed. Therefter, the power generated by generator 3 will vary as a function of its field current.

Thus, as wind velocity increases, the field current will increase as a cubic function of the wind velocity and linearly with respect to the power produced by the windmill, keeping the windmill operating at its most efficient speed.

In the above discussion, it is assumed that the electrical power generated by a conventional generator is a linear function of the field current. In practice, this is, of course, not accurate. Accordingly, in practice, one would measure and analyze the dependence of electrical output power generated on field current in the same manner as that employed above for each type of generating apparatus employed and adjust the operating characteristics of $Q_2$ accordingly.

While described in a system employing an electrical generator, it is understood that the present invention may also be employed in a system for controlling the pumping of water or other fluids and the turning of a flywheel or other mechanism by replacing the field with a suitable value, clutch, or the like. In these applications, one might employ a centrifugal clutch to aid starting, and a converter in conjunction with a flywheel. It is also believed apparent that other than electrical power may be generated more efficiently with the present invention.

Because the control system of the present invention achieves much more accuracy over a much wider range of wind velocities than heretofore possible with prior known apparatus and, moreover, because it is readily adjustable to accommodate even the more drastic changes in wind conditions as typically occur seasonally, other modifications and applications will undoubtedly occur to those skilled in the art.

For these reasons, the embodiments described hereinabove are intended only for purposes of illustration, leaving the scope of the present invention to be determined by reference to the claims hereinafter provided.

What is claimed is:

1. In an apparatus having a rotatable means responsive to a moving fluid having a variable velocity for generating power, a control system comprising: means responsive to a signal proportional to the velocity of said moving fluid which approximates, with an exponential function, a function to a power for generating a control signal proportional to the maximum power obtainable from said moving fluid by said rotatable means over a predetermined range of fluid velocities.

2. In an apparatus according to claim 1 wherein said generating means comprises:
   first means for generating a velocity signal proportional to the velocity of said moving fluid; and
   second means responsive to said velocity signal for generating said control signal.

3. In an apparatus according to claim 2 wherein said control signal varies as an exponential function of said velocity signal.

4. In an apparatus according to claim 3 wherein said exponential function is approximately equal to the third power of said velocity signal.

5. In an apparatus according to claim 4 wherein said velocity signal has an amplitude which varies over a predetermined range and further comprising means responsive to said velocity signal for restricting the generation of said control signal to a predetermined portion of said predetermined range.

6. In an apparatus according to claim 5 wherein said rotatable means is a windmill coupled to an electrical power generating means having a current-responsive field circuit for generating electrical power, and said moving fluid is air; and further wherein current in said current-responsive field circuit is proportional to said control signal.

7. In an apparatus according to claim 1 wherein said control signal generating means comprises an amplifying means having an input and an output for providing at its output an electrical output signal having an amplitude which is approximately proportional to the third power of the amplitude of an electrical signal applied to its input.

8. In an apparatus according to claim 7 wherein said rotatable means is a windmill coupled to an electrical generating means, said moving fluid is wind, and said windmill provides a maximum output power which varies as a cubic function of wind velocity; and further comprising means for generating said electrical input signal as a function of said wind velocity.

9. In an apparatus for generating power, including a windmill responsive to a wind of variable velocity, for driving an electrical generating means wherein the maximum power output from said windmill for driving said generating means varies approximately as a cubic function of the velocity of said wind over a predetermined range of wind velocities, a control system comprising:
   means for generating a first signal, E, proportional to said wind velocity; and
   means responsive to said first signal, E, for generating a second signal, I, proportional to said first signal, E, according to the relationship $$I \propto e^E \approx E^3,$$

wherein $e$ is the natural logarithm base, over said predetermined range of wind velocities.

10. In an apparatus according to claim 9 wherein said electrical generating means includes a field circuit responsive to a field current for generating electrical power as a function of said field current; and further wherein said field current is proportional to said second signal, I.

11. In an apparatus according to claim 10, a control system further comprising means responsive to said first signal, E, for initiating the generation of said second signal, I, at a predetermined value of said first signal, E.

12. In an apparatus according to claim 9 wherein said second signal generating means comprises an electrical signal amplifying means; and further comprising means for adjusting the operating characteristics of said amplifying means for changing said relationship between said first and second signals.

13. In an apparatus including a windmill responsive to a wind of variable velocity for driving an electrical power generating means for generating electrical power, a control system comprising:
   means for generating an electrical signal proportional to the velocity of said wind; and
   electrical signal amplifying means having an output which is an exponential function of its input responsive to said electrical signal for controlling the power generated by said electrical power generating means over a predetermined range of wind velocities whereby the power generated by said electrical power generating means is approximately linearly proportional to the output power of said windmill over said predetermined range of wind velocities.

14. An apparatus for obtaining maximum output power from a rotatable member being driven by wind or water or another fluid comprising:
   means for generating a first signal proportional to the velocity of said fluid; and
   means for generating a second signal which is a non-linear function of said first signal for controlling the velocity of rotation of said rotatable member in said fluid.

15. A method of obtaining maximum output power from a rotatable member being driven by wind or water or another fluid comprising the steps of:
   generating a first signal proportional to the velocity of said fluid; and
   generating a second signal which is a non-linear function of said first signal for controlling the velocity of rotation of said rotatable member in said fluid.

* * * * *